US012423796B1

United States Patent
Mao et al.

(10) Patent No.: US 12,423,796 B1
(45) Date of Patent: Sep. 23, 2025

(54) NEURAL NETWORK-BASED DEFECT DETECTION METHOD FOR GLUING QUALITY ON AIRCRAFT SKIN

(71) Applicant: Hunan University, Changsha (CN)

(72) Inventors: Jianxu Mao, Changsha (CN); Junfei Yi, Changsha (CN); Yaonan Wang, Changsha (CN); Hui Zhang, Changsha (CN); Kai Zeng, Changsha (CN); Ziming Tao, Changsha (CN); He Xie, Changsha (CN); Caiping Liu, Changsha (CN); Qing Zhu, Changsha (CN); Min Liu, Changsha (CN); Xian'en Zhou, Changsha (CN)

(73) Assignee: Hunan University, Changsha (CN)

( * ) Notice: Subject to any disclaimer, the term of this patent is extended or adjusted under 35 U.S.C. 154(b) by 0 days.

(21) Appl. No.: 19/232,262

(22) Filed: Jun. 9, 2025

Related U.S. Application Data

(63) Continuation of application No. PCT/CN2024/079001, filed on Feb. 28, 2024.

(30) Foreign Application Priority Data

Jun. 8, 2023 (CN) .......................... 202310676359.X

(51) Int. Cl.
*G06T 7/00* (2017.01)
*B64F 5/60* (2017.01)
(Continued)

(52) U.S. Cl.
CPC .............. *G06T 7/0004* (2013.01); *B64F 5/60* (2017.01); *G06V 10/761* (2022.01);
(Continued)

(58) Field of Classification Search
CPC ......... G06T 7/0004; G06T 2207/20016; G06T 2207/20021; G06T 2207/20081;
(Continued)

(56) References Cited

U.S. PATENT DOCUMENTS

| | | | |
|---|---|---|---|
| 2018/0268257 A1* | 9/2018 | Ren | .................... G06T 7/001 |
| 2023/0017082 A1* | 1/2023 | Stowell | ............... G01M 5/0033 |
| 2024/0048848 A1* | 2/2024 | Chik | ................... G01N 21/9515 |

FOREIGN PATENT DOCUMENTS

| | | | |
|---|---|---|---|
| CN | 111080627 A | 4/2020 | |
| CN | 114565579 A | 5/2022 | |

(Continued)

*Primary Examiner* — Ping Y Hsieh
(74) *Attorney, Agent, or Firm* — Nitin Kaushik

(57) ABSTRACT

Disclosed in the present invention is a neural network-based defect detection method for gluing quality on aircraft skin. The method includes: data acquisition: taking photos of aircraft skin by using a camera to acquire image data; preprocessing the acquired image data; annotating the data by using annotation software to acquire a data set for network training; establishing a defect detection network model based on feature erasure and boundary refinement, where the defect detection network model includes a feature extraction network, a semantic-guided feature erasure module, a multi-scale feature fusion network, and a defect prediction network based on boundary refinement, which are sequentially connected, the data set is used for training the network model, and trained model parameters are saved; and detecting a directly collected skin gluing image by using the trained network model and outputting detection results.

7 Claims, 5 Drawing Sheets

(51) Int. Cl.
*G06V 10/74* (2022.01)
*G06V 10/764* (2022.01)
*G06V 10/77* (2022.01)
*G06V 10/774* (2022.01)
*G06V 10/82* (2022.01)

(52) U.S. Cl.
CPC ........ *G06V 10/764* (2022.01); *G06V 10/7715* (2022.01); *G06V 10/774* (2022.01); *G06V 10/82* (2022.01); *G06T 2207/20016* (2013.01); *G06T 2207/20021* (2013.01); *G06T 2207/20081* (2013.01); *G06T 2207/20084* (2013.01)

(58) Field of Classification Search
CPC ............ G06T 2207/20084; B64F 5/60; G06V 10/761; G06V 10/764; G06V 10/7715; G06V 10/774; G06V 10/82
See application file for complete search history.

(56) References Cited

FOREIGN PATENT DOCUMENTS

| | | | | |
|---|---|---|---|---|
| CN | 115035065 A | 9/2022 | | |
| CN | 115829995 A | 3/2023 | | |
| CN | 116402821 A | 7/2023 | | |
| EP | 3739513 A1 | 11/2020 | | |
| WO | WO-2023163650 A2 * | 8/2023 | ........... | G06T 7/0004 |

* cited by examiner

NEURAL NETWORK-BASED DEFECT DETECTION METHOD FOR GLUING QUALITY ON AIRCRAFT SKIN

CROSS-REFERENCE TO RELATED APPLICATIONS

The present application claims priority to Chinese Patent Application No. 202310676359X, filed with the China National Intellectual Property Administration on Jun. 8, 2023 and entitled "NEURAL NETWORK-BASED DEFECT DETECTION METHOD FOR GLUING QUALITY ON AIRCRAFT SKIN", which is incorporated herein by reference in its entirety or part.

TECHNICAL FIELD

The present invention belongs to the technical field of defect detection of aircraft skin, and in particular relates to a neural network-based defect detection method for gluing quality on aircraft skin.

BACKGROUND

With rapid development of science and technology in China, aircraft play a crucial role in various fields such as military, transportation, and agriculture. As an important part of aircraft, ensuring manufacturing quality of aircraft skin is a crucial factor in determining overall performance and safe operation of the aircraft.

The primary cause of surface damage and defects on the aircraft skin lies in cyclic pressurization during takeoff and depressurization during landing, causing periodic expansion and contraction of a skin surface, thereby resulting in micro cracks in materials around rivets on the surface of the aircraft. Especially, harsh flight conditions can further accelerate crack propagation and induce corrosion. Such defects not only can affect the aesthetic surface of the aircraft skin, but also can destroy the surface integrity of the aircraft skin to a certain extent, leading to a reduction in structural strength that critically endangers the lives and property security of pilots, and passengers.

Traditional aircraft skin defect detection is commonly realized through visual inspection by technicians, which is closely related to the experience, sense of responsibility, and the like of the technicians, such that the conventional method exhibits significant limitations, is prone to problems such as missed defects, false defects and oversight defects, and is low in detection efficiency. With the continuous improvement of performance of aircraft equipment, accelerating development of corresponding detection technologies towards smart, integrated, digital, and online-enabled solutions is urgently needed. At present, most aviation manufacturing enterprises in China have widely adopted digital measurement equipment for surface defect detection of the aircraft skin, such as laser radars, laser trackers, and total stations. While transitioning from traditional detection methods dependent on tooling like mold lines and templates, the industry remains predominantly reliant on manual inspections by the technicians. In order to solve the prominent problems of poor consistency, low efficiency, and the like due to heavy reliance on manual labor for the acquisition of a detection technology, the neural network-based defect detection method for gluing quality on aircraft skin is proposed.

SUMMARY

In view of the technical problem, the present invention provides a neural network-based defect detection method for gluing quality on aircraft skin.

The present invention adopts the following technical solution to solve the technical problem.

The neural network-based defect detection method for gluing quality on aircraft skin includes the following steps:

S100: taking photos of the aircraft skin by using a high-definition industrial camera to acquire image data, and preprocessing the image data;

S200: annotating preprocessed data by using annotation software to obtain a data set for network training;

S300: establishing a defect detection network model based on feature erasure and boundary refinement, where the defect detection network model includes a feature extraction network, a semantic-guided feature erasure module, a multi-scale feature fusion network, and a defect prediction network based on boundary refinement, which are sequentially connected, the feature extraction network being configured to extract a multi-scale feature map, the semantic-guided feature erasure module being configured to process the multi-scale feature map to enable a predefined region of the feature map to have a predefined probability of being set to zero, the multi-scale feature fusion network being configured to deeply fuse processed features of different scales to obtain a fused multi-scale feature map, and the defect prediction network based on boundary refinement being configured to perform prediction on the basis of the fused multi-scale feature map to obtain classification prediction results and Bbox prediction results;

S400: training the defect detection network model by using the data set to obtain the classification prediction results and the Bbox prediction results, updating network weights through back propagation on the basis of the classification prediction results, the Bbox prediction results, and a predefined network loss function, and after completing predefined training rounds, obtaining a trained defect detection network model; and S500: detecting a directly collected skin gluing image by using the trained defect detection network model to obtain quality defect detection results.

Preferably, in S300, the feature extraction network being configured to extract the multi-scale feature map, and the semantic-guided feature erasure module being configured to process the multi-scale feature map to enable the predefined region of the feature map to have the predefined probability of being set to zero, include:

S311: extracting defect images in the data set by means of a residual network in the feature extraction network to obtain three input feature maps with different scale sizes;

S312: cutting any input feature map $F_{pre}$ into blocks according to a predefined size to obtain feature blocks $f_n$ with the same size and the same number of channels, where n represents the number of the feature blocks;

S313: inputting the input feature maps $F_{pre}$ into a global average pooling layer to obtain global semantic features g with global semantic feature information;

S314: calculating a semantic similarity cos_sim between each feature block $f_n$ and the global semantic features g, where a cosine distance is used as a similarity metric, and a calculation formula is as follows:

$$\cos\_sim = \frac{f_n \cdot g}{\|f_n\| \cdot \|g\|}$$

S315: sorting the semantic similarities cos_sim in descending order to obtain $L_{cs}$, and taking first K block matrixes $f_k$ with high similarity; and S316: inputting a $f_k$ feature into a DropOut layer and setting the probability of DropOut, that is, each element in the $f_k$ feature has the predefined probability of being set to zero.

Preferably, in S300, the defect prediction network based on boundary refinement being configured to perform prediction on the basis of the fused multi-scale feature map to obtain classification prediction results and Bbox prediction results, includes:

S321: inputting the fused multi-scale feature map $F_f$ into a defect feature enhancement network to obtain defect shape enhanced features $F_s$;

S322: inputting the defect shape enhanced features $F_s$ into coarse classification branches and coarse Bbox prediction branches, respectively to obtain coarse classification results $Cls_{coarse}$, enhanced classification features, coarse Bbox prediction results $Bbox_{coarse}$ and enhanced coarse Bbox prediction; inputting the coarse classification results and the enhanced classification features into a boundary-aware module of the coarse classification branches to obtain refined classification features $F_{cls\_g}$, and inputting the coarse Bbox prediction results and enhanced Bbox prediction into the boundary-aware module of the coarse Bbox prediction branches to obtain refined Bbox prediction features $F_{bbox\_g}$; and S323: fusing the refined classification features $F_{cls\_g}$ and the refined Bbox prediction features $F_{bbox\_g}$ with the defect shape enhanced features $F_s$, respectively to obtain fused results, and then inputting the fused results into two 1×1 convolutional layers to obtain final classification prediction results $Cls_{refine}$ and final Bbox prediction results $Bbox_{refine}$.

Preferably, the S321 includes:

S3211: inputting the fused multi-scale feature map $F_f$ into the defect feature enhancement network for a horizontal global average pooling operation and a vertical global average pooling operation, to obtain a horizontal feature $g_h$ and a vertical feature $g_w$ with slender shape-aware ability;

S3212: interpolating the horizontal feature $g_h$ and the vertical feature $g_w$ by a bilinear interpolation method to obtain a horizontal feature G, and a vertical feature $G_h$ that are consistent in size with the fused multi-scale feature map $F_f$, specifically:

$$G_h = F_{inter}(GAP_h(F_f))$$

$$G_w = F_{inter}(GAP_w(F_f))$$

where $F_{inter}$ represents the bilinear interpolation method, and $GAP_h$ and $GAP_w$ represent the vertical global average pooling operation and the horizontal global average pooling operation, respectively;

S3213: then performing corresponding element summation on the horizontal feature $G_w$ and the vertical feature $G_h$ to obtain fused features with vertical awareness and horizontal awareness, and sequentially enabling the fused features to be subjected to 1×1 convolution and a Sigmoid layer to obtain weights w that are consistent in the size with of the fused multi-scale feature map $F_f$; and S3214: performing element multiplication on the weights w and the fused multi-scale feature map $F_f$ to obtain defect shape enhanced features $F_s$, where the calculation formula is as follows:

$$w = \text{Sigmoid}(\text{conv1}(G_h + G_w))$$

$$F_s = F_f \cdot w$$

where Sigmoid represents the Sigmoid layer, conv1 represents 1×1 convolution, "+" represents element summation, and "·" represents element-wise multiplication.

Preferably, each of the coarse classification branches and each of the coarse Bbox prediction branches both include 4 3×3 convolutional layers and 1 1×1 convolutional layer, and S322 includes:

S3221: inputting the defect shape enhanced features $F_s$ into the coarse classification branches and the coarse Bbox prediction branches, respectively, performing enhancement by the 4 3×3 convolutional layers to obtain the enhanced classification features $F'_{s\_cls}$ and the enhanced coarse Bbox prediction features $F'_{s\_bbox}$, outputting the enhanced classification features $F'_{s\_cls}$ by the 1×1 convolutional layer to obtain a coarse classification result $Cls_{coarse}$, outputting the enhanced coarse Bbox prediction features $F'_{s\_bbox}$ by the 1×1 convolutional layer to obtain a coarse Bbox coordinate bias $\Delta Bbox_{coarse}$, and decoding the coarse Bbox coordinate bias $\Delta Bbox_{coarse}$ to obtain prediction Bbox coordinates $Bbox_{coarse}$; and S3222: inputting the prediction Bbox coordinates $\Delta Bbox_{coarse}$ and the enhanced classification features $F'_{s\_cls}$ into the boundary-aware module of the coarse classification branches to obtain the refined classification features $F_{cls\_g}$ with boundary awareness, and inputting the prediction Bbox coordinates $\Delta Bbox_{coarse}$ and the enhanced coarse Bbox prediction features $F'_{s\_bbox}$ into the boundary-aware module of the coarse Bbox prediction branches to obtain refined Bbox prediction features $F_{bbox\_g}$ with boundary awareness.

Preferably, the S3222 includes:

S32221: inputting the enhanced classification features $F'_{s\_cls}$ and the enhanced coarse Bbox prediction features $F'_{s\_bbox}$ into 2 3×3 convolutional layers to obtain central features $F'_{s\_c}$ and boundary features $F'_{s\_b}$, respectively, and concatenating the central features $F'_{s\_c}$ and the boundary features $F'_{s\_b}$ to obtain the concatenated features $F'_{s\_cb}$;

S32222: inputting the features $F'_{s\_b}$ and coarse prediction Bbox coordinates $Bbox_{coarse}$ into a boundary alignment module, firstly, uniformly sampling N points from four edges of a coarse prediction Bbox by the boundary alignment module, obtaining the value of the feature map $F'_{s\_b}$ corresponding to each point by the bilinear interpolation method, and taking the maximum feature value among the N points as a boundary-aware value of a corresponding edge, and obtaining an output $F''_{s\_b}$;

S32223: simultaneously inputting the features $F'_{s\_cb}$ into the 3×3 convolutional layers and a Sigmoid function to obtain a mask for each point; and $$\text{mask} = \text{Sigmoid}(\text{conv3}(F'_{s\_cb}))$$

$$F_{cls\_g} \text{ or } F_{bbox\_g} = \text{conv1}(\text{mask} \cdot F'_{s\_cb})$$

S32224: performing element-wise multiplication on the mask and the concatenated features $F'_{s\_cb}$, and performing dimensionality reduction on the processed mask through the 1×1 convolution as output $F_{bbox\_g}$ or $F_{cls\_g}$ of the boundary-aware module.

Preferably, the calculation formula of S32222 is as follows:

$$F''_{s\_b}(i,j) = \begin{cases} F'_{s\_b}(i,j) & 0 \le c < C \\ \max_{0 \le k \le N-1}\left(F'_{s\_b}(x_0, y_0 + kh/N)\right) & C \le c < 2C \\ \max_{0 \le k \le N-1}\left(F'_{s\_b}(x_0 + kw/N, y_0)\right) & 2C \le c < 3C \\ \max_{0 \le k \le N-1}\left(F'_{s\_b}(x_1, y_0 + kh/N)\right) & 3C \le c < 4C \\ \max_{0 \le k \le N-1}\left(F'_{s\_b}(x_0 + kw/N, y_1)\right) & 4C \le c < 5C \end{cases}$$

where C represents the number of channels, (i, j) represents a coordinate of each feature point, $(x_0, y_0)$ represents a coordinate of a point at an upper left corner of the coarse prediction Bbox, $(x_1, y_1)$ represents a coordinate of a lower right corner of the coarse prediction Bbox, k represents positions of sampling points (0≤k≤N−1), N represents the number of sampling points, and h and w represent the height and the width of the prediction Bbox, respectively.

Preferably, a predefined network loss function includes classification loss Focal Loss and Bbox prediction loss GIoU Loss, where the classification loss includes coarse classification loss $Loss_{cls\_coa}$ and final refined classification loss $Loss_{cls\_ref}$, and the Bbox prediction loss GIoU Loss includes coarse prediction loss $Loss_{reg\_coa}$ and refined prediction loss$Loss_{reg\_ref}$;

the classification loss Focal Loss is calculated as follows:

Focal Loss=−y(1−p)$^γ$log(p)−(1−y)p$^γ$log(1−p)

$Loss_{cls}=Loss_{cls\_coa}+γ_1 \cdot Loss_{cls\_ref}$ where y represents a true label of classification, p represents a predicted value of coarse classification or refined classification, and $γ_1$ is a hyperparameter configured to adjust weights between coarse classification loss and the refined classification loss;

the Bbox prediction loss GIoU Loss is calculated as follows:

$$GIoU \text{ Loss} = IoU - \frac{|A_c - U|}{|A_c|}$$

$Loss_{reg}=Loss_{reg\_coa}+γ_2 \cdot Loss_{reg\_ref}$ where IoU represents an intersection-to-union ratio between the label and the prediction Bbox, C represents a minimum enclosing shape, $A_c$ represents the area of the C, U represents areas of A and B, and $γ_2$ is a hyperparameter configured to adjust the weights between the coarse Bbox prediction loss and the refined Bbox prediction loss; and finally, the loss function of the entire network is calculated as follows:

$Loss=Loss_{reg}+γ \cdot Loss_{cls}$ where γ is a hyperparameter configured to adjust a weight ratio between the classification loss and the Bbox prediction loss.

DETAILED DESCRIPTION OF THE EMBODIMENTS

In order to provide a better understanding of the technical solution of the present invention for those skilled in the art, the present invention will be described below in detail with reference to the accompanying drawings.

Figure 1:
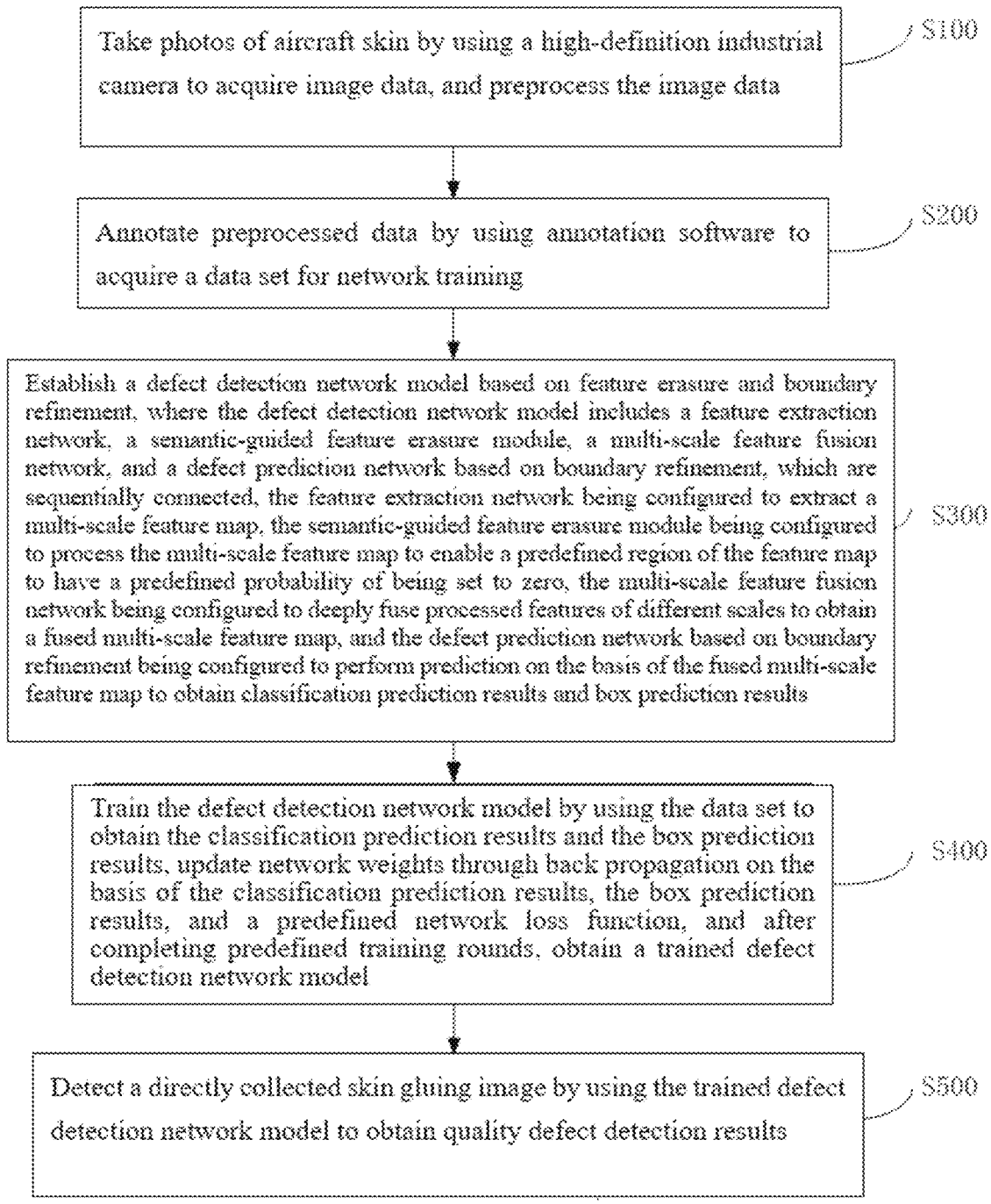
FIG. 1 is a flowchart of a neural network-based defect detection method for gluing quality on aircraft skin according to an embodiment of the present invention.

In an embodiment, as shown in FIG. 1, a neural network-based defect detection method for gluing quality on aircraft skin includes the following steps:

S100: taking photos of the aircraft skin by using a high-definition industrial camera to acquire image data, and preprocessing the image data;

S200: annotating preprocessed data by using annotation software to obtain a data set for network training;

S300: establishing a defect detection network model based on feature erasure and boundary refinement, where the defect detection network model includes a feature extraction network, a semantic-guided feature erasure module, a multi-scale feature fusion network, and a defect prediction network based on boundary refinement, which are sequentially connected, the feature extraction network being configured to extract a multi-scale feature map, the semantic-guided feature erasure module being configured to process the multi-scale feature map to enable a predefined region of the feature map to have a predefined probability of being set to zero, the multi-scale feature fusion network being configured to deeply fuse processed features of different scales to obtain a fused multi-scale feature map, and the defect prediction network based on boundary refinement being configured to perform prediction on the basis of the fused multi-scale feature map to obtain classification prediction results and Bbox prediction results;

S400: training the defect detection network model by using the data set to obtain the classification prediction results and the Bbox prediction results, updating network weights through back propagation on the basis of the classification prediction results, the Bbox prediction results, and a predefined network loss function, and after completing predefined training rounds, obtaining a trained defect detection network model; and S500: detecting a directly collected skin gluing image by using the trained defect detection network model to obtain quality defect detection results.

Figure 2:
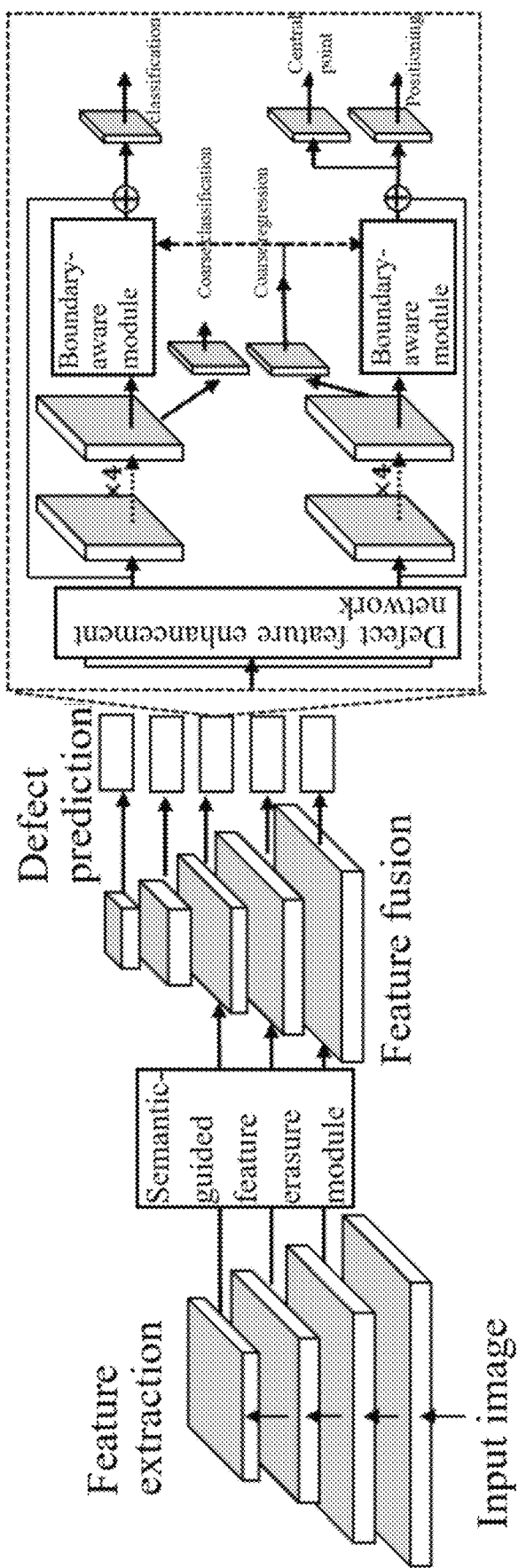
FIG. 2 is a schematic structural diagram of a defect detection network model according to an embodiment of the present invention.

Specifically, a schematic structural diagram of the defect detection network model is shown as FIG. 2.

According to the neural network-based defect detection method for gluing quality on aircraft skin, the defect detection network model based on feature erasure and boundary refinement can quickly and accurately achieve non-destructive testing of gluing defects of the aircraft skin, thereby promoting the high-quality intelligent manufacturing process of the skin.

Figure 3:
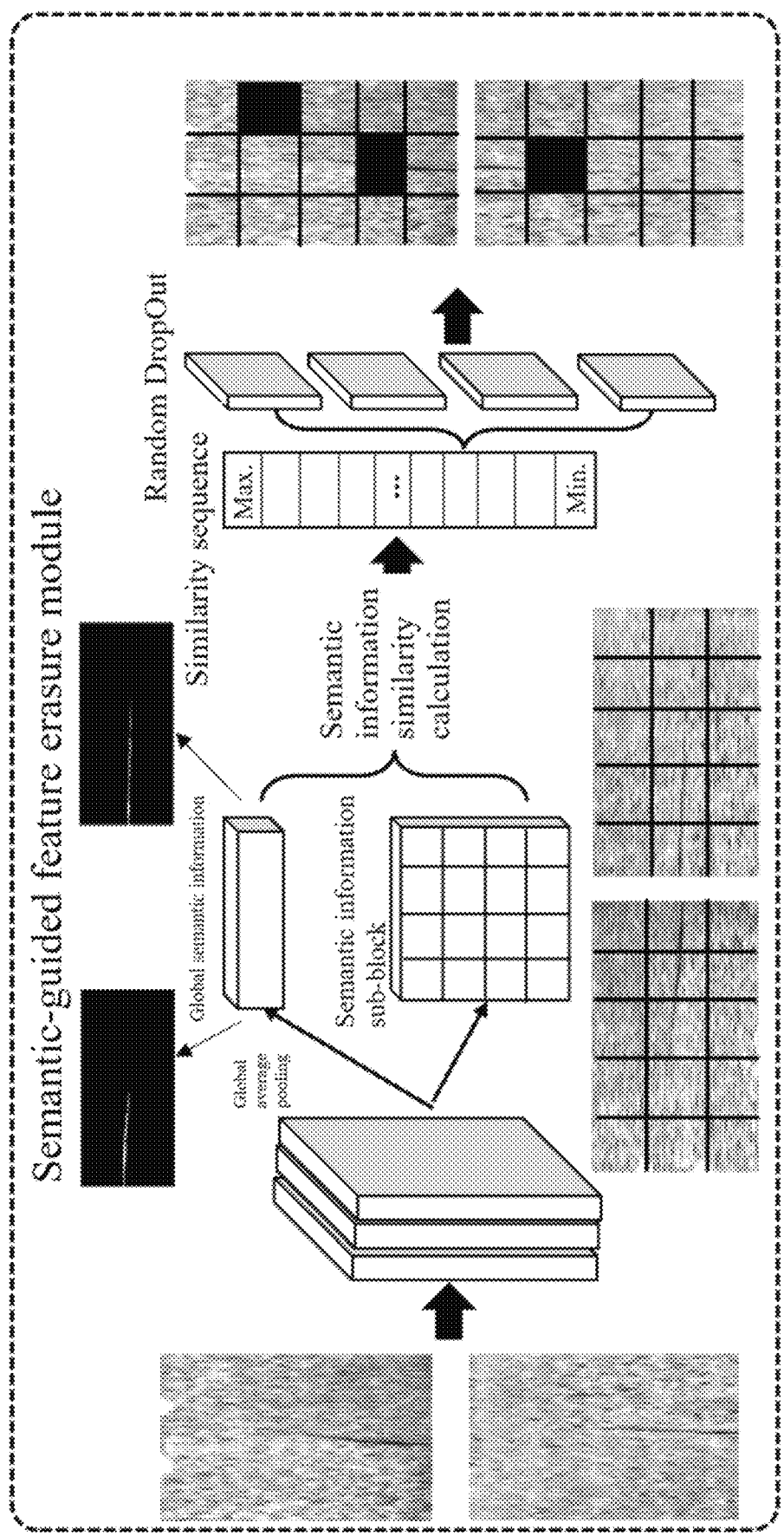
FIG. 3 is a schematic structural diagram of a semantic-guided feature erasure module according to an embodiment of the present invention.

In an embodiment, as shown in FIG. 3, in S300, the feature extraction network being configured to extract the multi-scale feature map, and the semantic-guided feature erasure module being configured to process the multi-scale feature map to enable the predefined region of the feature map to have the predefined probability of being set to zero, include:

S311: extracting defect images in the data set by means of a residual network in the feature extraction network to obtain three input feature maps with different scale sizes;

S312: cutting any input feature map $F_{pre}$ into blocks according to a predefined size to obtain feature blocks $f_n$ with the same size and the same number of channels, where n represents the number of the feature blocks;

S313: inputting the input feature maps $F_{pre}$ into a global average pooling layer to obtain global semantic features g with global semantic feature information;

S314: calculating a semantic similarity cos_sim between each feature block $f_n$ and the global semantic features g, where a cosine distance is used as a similarity metric, and a calculation formula is as follows:

$$\cos\_sim = \frac{f_n \cdot g}{\|f_n\| \cdot \|g\|}$$

S315: sorting the semantic similarities cos_sim in descending order to obtain $L_{cs}$, and taking first K block matrixes $f_k$ with high similarity; and S316: inputting a $f_k$ feature into a DropOut layer and setting the probability of DropOut, that is, each element in the $f_k$ feature has the predefined probability of being set to zero.

Specifically, after defect images are extracted by means of the residual network, three feature maps F1, F2 and F3 with different scale sizes are obtained. In order to enhance the robustness of the network, the semantic-guided feature erasure module is adopted for feature processing, such that some regions of the feature map have a certain probability of being set to zero. In the embodiment, the probability of DropOut is set to 0.4, i.e., each element in the $f_k$ feature has the probability of 0.4 being set to 0, which can enhance the feature extraction ability of the neural network and enable the extracted features to have more robustness. Due to high similarity between $f_k$ and global semantic information, the $f_k$ feature is more discriminative compared to other features.

Further, the feature fusion module often includes a Feature Pyramid Network (FPN), which exists to acquire feature maps with high-level semantic information and low-level position information, and then deeply fuse features of different scales. Due to different sizes of the feature maps in different layers of ResNet, receptive fields of the feature maps mapped back to original images are also different, and usually high-level features are more semantic, while low-level features belong to pixel-level position information. By using horizontal connection and vertical connection of the FPN and other manners for feature fusion, high-level semantic features and low-level pixel features can be effectively fused. Due to small surface defects on the aircraft skin and unclear features between the defects and the background, the high-level feature maps with semantic information are fused through a top-down feature fusion module to enable bottom-level pixel level features to have the high-level semantic information, thereby improving detection accuracy. To this end, a top-down feature pyramid structure is adopted to fuse foreign object features. In the method of the present invention, instead of a five-layer FPN structure of a classic target detection algorithm RetinaNet, only four layers of feature maps with different scale sizes are selected to construct the feature pyramid structure, with number of channels being 256, 512, 1024, and 2048, respectively. After the 1×1 convolution, the number of the channels is unified to 256 dimensions. This can reduce the number of parameters during a detection process while ensuring defect detection accuracy for the aircraft skin, thereby optimizing the detected network structure, reducing computational power consumption, accelerating the detection speed to a certain extent, and achieving the purpose of saving training time.

In an embodiment, as shown in FIG. 2, in S300, the defect prediction network based on boundary refinement being configured to perform prediction on the basis of the fused multi-scale feature map to obtain classification prediction results and Bbox prediction results, includes:

S321: inputting the fused multi-scale feature map $F_f$ into a defect feature enhancement network to obtain defect shape enhanced features $F_s$;

S322: inputting the defect shape enhanced features $F_s$ into coarse classification branches and coarse Bbox prediction branches, respectively to obtain coarse classification results $Cs_{coarse}$, enhanced classification features, coarse Bbox prediction results $Bbox_{coarse}$ and enhanced coarse Bbox prediction; inputting the coarse classification results and the enhanced classification features into a boundary-aware module of the coarse classification branches to obtain refined classification features $F_{cls\_g}$, and inputting the coarse Bbox prediction results and enhanced Bbox prediction into the boundary-aware module of the coarse Bbox prediction branches to obtain refined Bbox prediction features $F_{bbox\_g}$; and S323: fusing the refined classification features $F_{cls\_g}$ and the refined Bbox prediction features $F_{bbox\_g}$ with the defect shape enhanced features $F_s$, respectively to obtain fused results, and then inputting the fused results into two 1×1 convolutional layers to obtain final classification prediction results $Cls_{refine}$ and final Bbox prediction results $Bbox_{refine}$.

Figure 4:
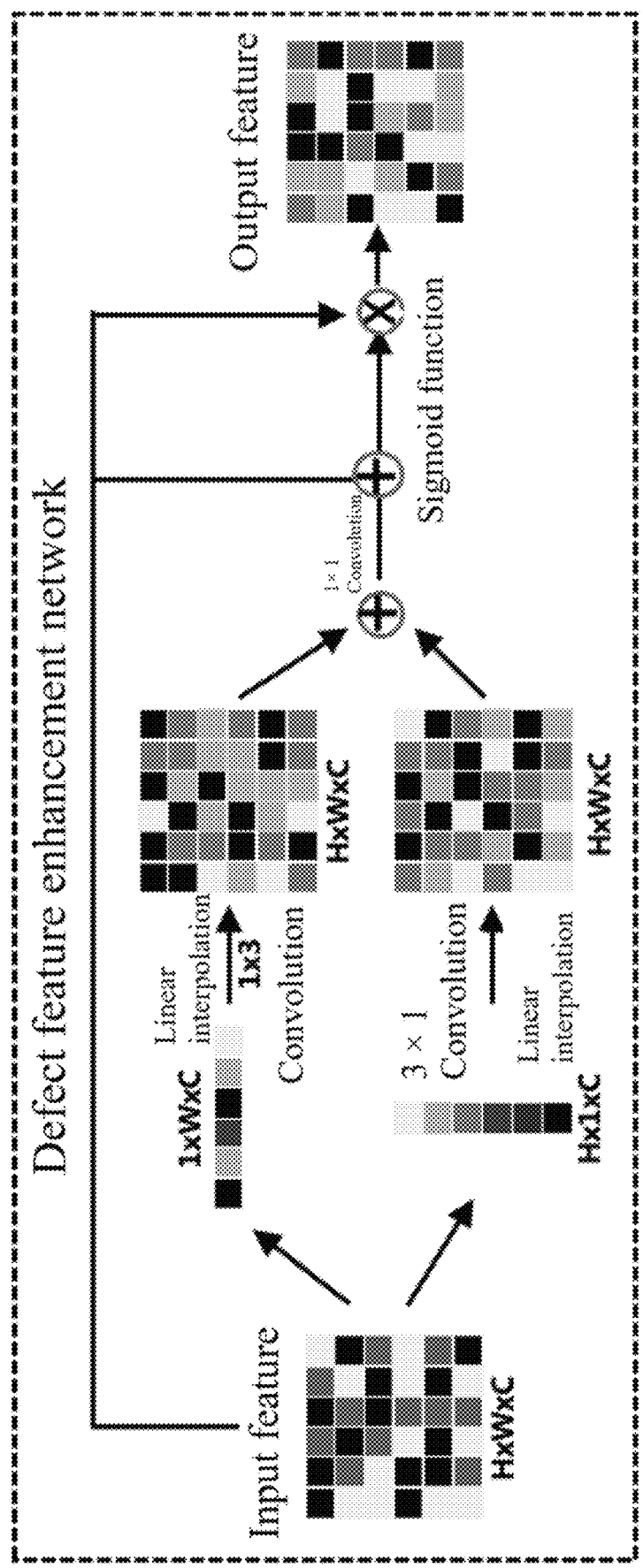
FIG. 4 is a schematic structural diagram of a defect feature enhancement network according to an embodiment of the present invention.

In an embodiment, as shown in FIG. 4, S321 includes:

S3211: inputting the fused multi-scale feature map $F_f$ into the defect feature enhancement network for a horizontal global average pooling operation and a vertical global average pooling operation, to obtain a horizontal feature $g_h$ and a vertical feature $g_w$ with slender shape-aware ability;

S3212: interpolating the horizontal feature $g_h$ and the vertical feature $g_w$ by a bilinear interpolation method to obtain a horizontal feature $G_w$ and a vertical feature $G_h$ that are consistent in size with the fused multi-scale feature map $F_f$, specifically:

$$G_h = F_{inter}(GAP_h(F_f))$$

$$G_w = F_{inter}(GAP_w(F_f))$$

where $F_{inter}$ represents the bilinear interpolation method, and $GAP_h$ and $GAP_w$ represent the vertical global average pooling operation and the horizontal global average pooling operation, respectively;

S3213: then performing corresponding element summation on the horizontal feature G, and the vertical feature $G_h$ to obtain fused features with vertical awareness and horizontal awareness, and sequentially enabling the fused features to be subjected to 1×1 convolution and a Sigmoid layer to obtain weights w that are consistent in the size with of the fused multi-scale feature map $F_f$; and S3214: performing element multiplication on the weights w and the fused multi-scale feature map $F_f$ to obtain defect shape enhanced features $F_s$, where the calculation formula is as follows:

$$w = \mathrm{Sigmoid}(\mathrm{conv1}(G_h + G_w))$$

$$F_s = F_f w$$

where Sigmoid represents the Sigmoid layer, conv1 represents 1×1 convolution, "+" represents element summation, and "·" represents element-wise multiplication.

Specifically, since most of gluing defects for the skin are slender and barely visible, morphological features are easily ignored by the network model, and the defect feature enhancement network is used to enhance gluing defects for the skin, thereby ensuring effective enhancement of the morphological features.

In an embodiment, as shown in FIG. 2, each of the coarse classification branches and each of the coarse Bbox prediction branches both include 4 3×3 convolutional layers and 1 1×1 convolutional layer, and S322 includes:

S3221: inputting the defect shape enhanced features $F_s$ into the coarse classification branches and the coarse Bbox prediction branches, respectively, performing enhancement by the 4 3×3 convolutional layers to obtain the enhanced classification features $F'_{s\_cls}$ and the enhanced coarse Bbox prediction features $F'_{s\_bbox}$, outputting the enhanced classification features $F'_{s\_cls}$ by the 1×1 convolutional layer to obtain a coarse classification result $\mathrm{Cls}_{coarse}$, outputting the enhanced coarse Bbox prediction features $F'_{s\_bbox}$ by the 1×1 convolutional layer to obtain a coarse Bbox coordinate bias $\Delta \mathrm{Bbox}_{coarse}$, and decoding the coarse Bbox coordinate bias $\Delta \mathrm{Bbox}_{coarse}$ to obtain prediction Bbox coordinates $\mathrm{Bbox}_{coarse}$; and S3222: inputting the prediction Bbox coordinates $\Delta \mathrm{Bbox}_{coarse}$ and the enhanced classification features $F'_{s\_cls}$ into the boundary-aware module of the coarse classification branches to obtain the refined classification features $F_{cls\_g}$ with boundary awareness, and inputting the prediction Bbox coordinates $\Delta \mathrm{Bbox}_{coarse}$ and the enhanced coarse Bbox prediction features $F'_{s\_bbox}$ into the boundary-aware module of the coarse Bbox prediction branches to obtain refined Bbox prediction features $F_{bbox\_g}$ with boundary awareness.

Figure 5:
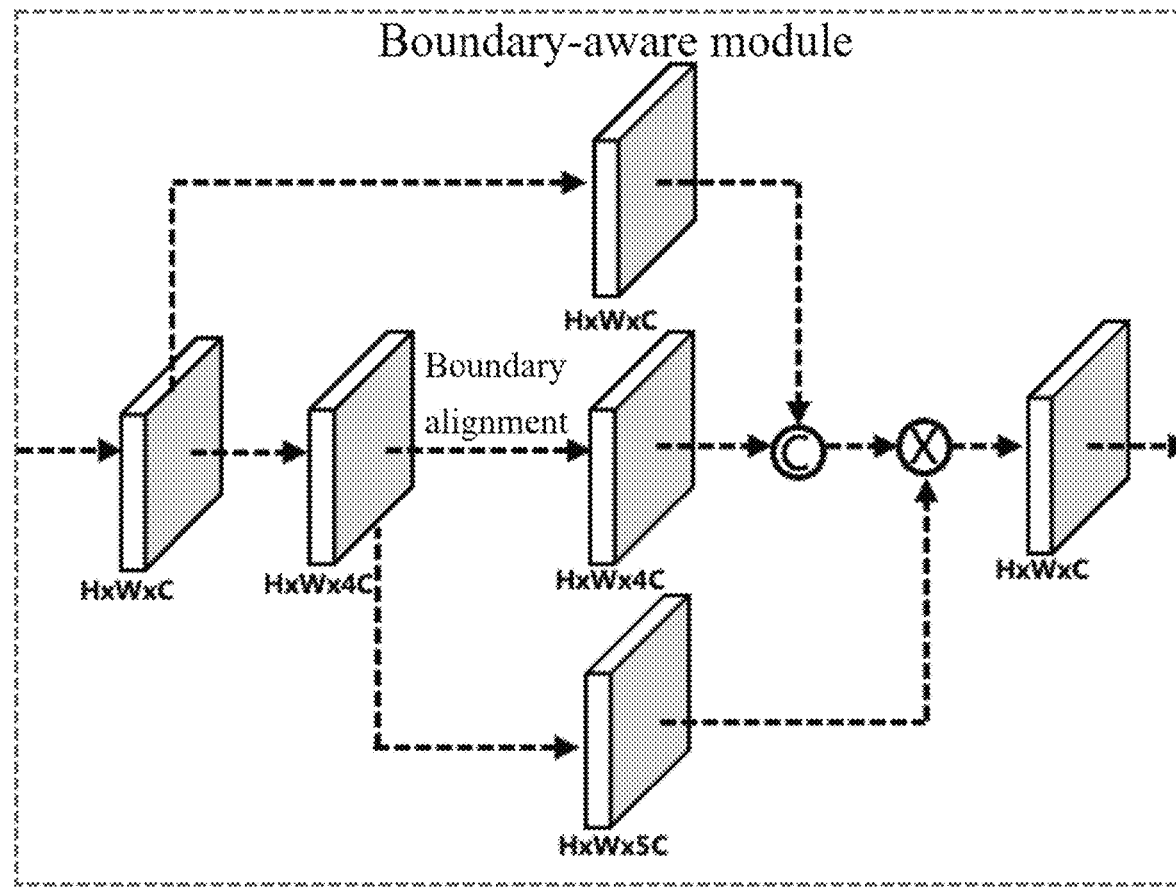
FIG. 5 is a schematic structural diagram of a boundary-aware module according to an embodiment of the present invention.

In an embodiment, as shown in FIG. 5, S3222 includes:

S32221: inputting the enhanced classification features $F'_{s\_cls}$ and the enhanced coarse Bbox prediction features $F_{s\_bbox}$ into 2 3×3 convolutional layers to obtain central features $F'_{s\_c}$ and boundary features $F'_{s\_b}$, respectively, and concatenating the central features $F'_{s\_c}$ and the boundary features $F'_{s\_b}$ to obtain the concatenated features $F'_{s\_cb}$;

S32222: inputting the features $F'_{s\_b}$ and coarse prediction Bbox coordinates $\mathrm{Bbox}_{coarse}$ into a boundary alignment module, firstly, uniformly sampling N points from four edges of a coarse prediction Bbox by the boundary alignment module, obtaining the value of the feature map $F'_{s\_b}$ corresponding to each point by the bilinear interpolation method, and taking the maximum feature value among the N points as a boundary-aware value of a corresponding edge, and obtaining an output $F''_{s\_b}$;

S32223: simultaneously inputting the features $F'_{s\_cb}$ into the 3×3 convolutional layers and a Sigmoid function to obtain a mask for each point; and $$\mathrm{mask} = \mathrm{Sigmoid}(\mathrm{conv3}(F'_{s\_cb}))$$

$$F_{cls\_g} \text{ or } F_{bbox\_g} = \mathrm{conv1}(\mathrm{mask} \cdot F'_{s\_cb})$$

S32224: performing element-wise multiplication on the mask and the concatenated features $F'_{s\_cb}$, and performing dimensionality reduction on the processed mask through the 1×1 convolution as output $F_{bbox\_g}$ or $F_{cls\_g}$ of the boundary-aware module.

Further, the calculation formula of S32222 is as follows:

$$F''_{s\_b}(i, j) = \begin{cases} F'_{s\_b}(i, j) & 0 \leq c < C \\ \max_{0 \leq k \leq N-1}(F'_{s\_b}(x_0, y_0 + kh/N)) & C \leq c < 2C \\ \max_{0 \leq k \leq N-1}(F'_{s\_b}(x_0 + kw/N, y_0)) & 2C \leq c < 3C \\ \max_{0 \leq k \leq N-1}(F'_{s\_b}(x_1, y_0 + kh/N)) & 3C \leq c < 4C \\ \max_{0 \leq k \leq N-1}(F'_{s\_b}(x_0 + kw/N, y_1)) & 4C \leq c < 5C \end{cases}$$

where C represents the number of channels, (i, j) represents a coordinate of each feature point, ($x_0$, $y_0$) represents a coordinate of a point at an upper left corner of the coarse prediction Bbox, ($x_1$, $y_1$) represents a coordinate of a lower right corner of the coarse prediction Bbox, k represents positions of sampling points (0≤k≤N−1), N represents the number of sampling points, and h and w represent the height and the width of the prediction Bbox, respectively Further, according to a residual learning idea, the obtained features $F_{bbox\_g}$ or $F_{cls\_g}$ with boundary awareness or the shape enhanced features $F_s$ are subjected to element summation, and then inputted into the 1×1 convolutional layer to obtain a final refined classification score $\mathrm{Cls}_{refine}$ or a Bbox bias prediction result $\mathrm{Bbox}_{refine}$.

Finally, losses among coarse classification, coarse Bbox prediction, final classification prediction, final Bbox prediction, and true labels are calculated, respectively.

In an embodiment, a predefined network loss function includes classification loss Focal Loss and Bbox prediction loss GIoU Loss, where the classification loss includes coarse classification loss $\mathrm{Loss}_{cls\_coa}$ and final refined classification loss $\mathrm{Loss}_{cls\_ref}$, and the Bbox prediction loss GIoU Loss includes coarse prediction loss $\mathrm{Loss}_{reg\_coa}$ and refined prediction loss $\mathrm{Loss}_{reg\_ref}$;

the classification loss Focal Loss is calculated as follows:

$$\text{Focal Loss} = -y(1-p)^\gamma \log(p) - (1-y) p^\gamma \log(1-p)$$

$$\mathrm{Loss}_{cls} = \mathrm{Loss}_{cls\_coa} + \gamma_1 \cdot \mathrm{Loss}_{cls\_ref}$$

where y represents a true label of classification, p represents a predicted value of coarse classification or refined classification, and $\gamma_1$ is a hyperparameter configured to adjust weights between coarse classification loss and the refined classification loss;

the Bbox prediction loss GIoU Loss is calculated as follows:

$$\text{GIoU Loss} = IoU - \frac{|A_c - U|}{|A_c|}$$

$$\mathrm{Loss}_{reg} = \mathrm{Loss}_{reg\_coa} + \gamma_2 \cdot \mathrm{Loss}_{reg\_ref}$$

where IoU represents an intersection-to-union ratio between the label and the prediction Bbox, C represents a minimum enclosing shape, $A_c$ represents the area of the C, U represents areas of A and B, and $\gamma_2$ is a hyperparameter configured to adjust the weights between the coarse Bbox prediction loss and the refined Bbox prediction loss;

and finally, the loss function of the entire network is calculated as follows:

$$Loss = Loss_{reg} + \gamma \cdot Loss_{cls}$$

where $\gamma$ is a hyperparameter configured to adjust a weight ratio between the classification loss and the Bbox prediction loss.

Specifically, the classification loss includes two aspects: coarse classification loss $Loss_{cls\_coa}$ and final refined classification loss $Loss_{cls\_ref}$ In order to alleviate the problem of imbalance between positive and negative samples, Focal Loss is used as the classification loss; and the Bbox prediction loss also correspondingly includes two types: coarse prediction loss $Loss_{reg\_coa}$ and refined prediction loss $Loss_{reg\_ref}$, both of which use GIoU loss as the Bbox prediction loss.

Further, the neural network is trained by using a back propagation algorithm and a stochastic gradient descent algorithm, and training weights are saved.

Firstly, the back propagation algorithm is used to calculate the gradient of the loss function relative to each parameter, and a chain rule is used to traverse the network in a reverse order (namely, from an output layer to an input layer) to calculate the gradient. The back propagation algorithm will repeatedly use intermediate values saved in forward propagation to avoid duplicate calculations and save computation time.

If the gradient descent algorithm is used, the computation cost for each independent variable iteration is $O_{(n)}$, which increases linearly with n (the number of samples). Therefore, when a training data set is larger, the computation cost for the gradient descent in each iteration will be higher, and the computation cost generated during iterations can be reduced by using stochastic gradient descent. In each iteration of the stochastic gradient descent, the algorithm randomly selects a part of samples and updates model parameters by calculating the gradients of the samples, gradually approaching an optimal solution. We randomly and uniformly sample an index i from a data sample, where $i \in 1, \ldots, n$, and calculate the gradient $\nabla J(\theta)$ to update the weights $\theta$:

$$\theta_{n+1} = \theta_n - \eta \cdot \nabla J_i(\theta)$$

where $\theta_{n+1}$ is an updated parameter value in the neural network, $\theta_n$ is the current parameter value, $\nabla$ is a gradient, $J(\theta)$ is the function, and $\eta$ is a learning rate.

In a repeated training process, the steps of forward propagation, calculating loss, back propagation, and updating weights and biases are repeated until the model converges, and whether the model converges is determined by comparing the changes in the loss function values.

The training weights are saved, once training of the model is complete, the training weights are saved. These weights can be used for prediction. The weights are saved to a file for reloading when needed.

According to the neural network-based defect detection method for gluing quality on aircraft skin, the defect detection network model based on feature erasure and boundary refinement can quickly and accurately achieve non-destructive testing of gluing defects of the aircraft skin, thereby promoting the high-quality intelligent manufacturing process of the skin. The prominent problems in the prior art of poor consistency and low efficiency due to heavy reliance on manual labor for the acquisition of a detection technology, are solved.

The above are preferred embodiments of the present invention. It should be noted that, for those of ordinary skill in the art, a plurality of improvements and modifications may be made without departing from the principle of the present invention, and the improvements and modifications are also regarded to be within the protection scope of the present invention.

What is claimed is:

1. A neural network-based defect detection method for gluing quality on aircraft skin, comprising the following steps:

S100: taking photos of the aircraft skin by using a high-definition industrial camera to acquire image data, and preprocessing the image data;

S200: annotating preprocessed data by using annotation software to obtain a data set for network training;

S300: establishing a defect detection network model based on feature erasure and boundary refinement, wherein the defect detection network model comprises a feature extraction network, a semantic-guided feature erasure module, a multi-scale feature fusion network, and a defect prediction network based on boundary refinement, which are sequentially connected, the feature extraction network being configured to extract a multi-scale feature map, the semantic-guided feature erasure module being configured to process the multi-scale feature map to enable a predefined region of the feature map to have a predefined probability of being set to zero, the multi-scale feature fusion network being configured to deeply fuse processed features of different scales to obtain a fused multi-scale feature map, and the defect prediction network based on boundary refinement being configured to perform prediction on the basis of the fused multi-scale feature map to obtain classification prediction results and Bbox prediction results;

S400: training the defect detection network model by using the data set to obtain the classification prediction results and the Bbox prediction results, updating network weights through back propagation on the basis of the classification prediction results, the Bbox prediction results, and a predefined network loss function, and after completing predefined training rounds, obtaining a trained defect detection network model;

S500: detecting a directly collected skin gluing image by using the trained defect detection network model to obtain quality defect detection results;

in S300, the feature extraction network being configured to extract the multi-scale feature map, and the semantic-guided feature erasure module being configured to process the multi-scale feature map to enable the predefined region of the feature map to have the predefined probability of being set to zero, comprise:

S311: extracting defect images in the data set by means of a residual network in the feature extraction network to obtain three input feature maps with different scale sizes;

S312: cutting any input feature map $F_{pre}$ into blocks according to a predefined size to obtain feature blocks $f_n$ with the same size and the same number of channels, wherein n represents the number of the feature blocks;

S313: inputting the input feature maps $F_{pre}$ into a global average pooling layer to obtain global semantic features g with global semantic feature information;

S314: calculating a semantic similarity cos_sim between each feature block $f_n$ and the global semantic features g, wherein a cosine distance is used as a similarity metric, and a calculation formula is as follows:

$$\cos\_sim = \frac{f_n \cdot g}{\|f_n\| \cdot \|g\|}$$

S315: sorting the semantic similarities cos_sim in descending order to obtain $L_{cs}$ and taking first K block matrixes $f_k$ with high similarity; and S316: inputting a $f_k$ feature into a DropOut layer and setting the probability of DropOut, that is, each element in the $f_k$ feature has the predefined probability of being set to zero.

2. The method of claim 1, wherein in S300, the defect prediction network based on boundary refinement being configured to perform prediction on the basis of the fused multi-scale feature map to obtain classification prediction results and Bbox prediction results, comprises:

S321: inputting the fused multi-scale feature map $F_f$ into a defect feature enhancement network to obtain defect shape enhanced features $F_s$;

S322: inputting the defect shape enhanced features $F_s$ into coarse classification branches and coarse Bbox prediction branches, respectively to obtain coarse classification results $Cls_{coarse}$, enhanced classification features, coarse Bbox prediction results $Bbox_{coarse}$ and enhanced coarse Bbox prediction; inputting the coarse classification results and the enhanced classification features into a boundary-aware module of the coarse classification branches to obtain refined classification features $F_{cls\_g}$, and inputting the coarse Bbox prediction results and enhanced Bbox prediction into the boundary-aware module of the coarse Bbox prediction branches to obtain refined Bbox prediction features $F_{bbox\_g}$; and S323: infusing the refined classification features $F_{cls\_g}$ and the refined Bbox prediction features $F_{bbox\_g}$ with the defect shape enhanced features $F_s$, respectively to obtain fused results, and then inputting the fused results into two 1×1 convolutional layers to obtain final classification prediction results $Cls_{refine}$ and final Bbox prediction results $Bbox_{refine}$.

3. The method of claim 2, wherein S321 comprises:

S3211: inputting the fused multi-scale feature map $F_f$ into the defect feature enhancement network for horizontal and vertical global average pooling operations, to obtain a horizontal feature $g_h$ and a vertical feature $g_v$ with slender shape-aware ability;

S3212: interpolating the horizontal feature $g_h$ and the vertical feature $g_w$ by a bilinear interpolation method to obtain a horizontal feature $G_w$ and a vertical feature $G_h$ that are consistent in size with the fused multi-scale feature map $F_f$, specifically:

$$G_h = F_{inter}(GAP_h(F_f))$$

$$G_w = F_{inter}(GAP_w(F_f))$$

wherein $F_{inter}$ represents the bilinear interpolation method, and $GAP_h$ and $GAP_w$ represent the vertical global average pooling operation and the horizontal global average pooling operation, respectively;

S3213: then performing corresponding element summation on the horizontal feature $G_w$ and the vertical feature $G_h$ to obtain fused features with vertical awareness and horizontal awareness, and sequentially enabling the fused features to be subjected to 1×1 convolution and a Sigmoid layer to obtain weights w that are consistent in the size with of the fused multi-scale feature map $F_f$; and S3214: performing element multiplication on the weights w with the fused multi-scale feature map $F_f$ to obtain defect shape enhanced features $F_s$, wherein the calculation formula is as follows:

$$w = \text{Sigmoid}(\text{conv1}(G_h + G_w))$$

$$F_s = F_f w$$

wherein Sigmoid represents the Sigmoid layer, conv1 represents 1×1 convolution, "+" represents element summation, and "–" represents element-wise multiplication.

4. The method of claim 3, wherein each of the coarse classification branches and each of the coarse Bbox prediction branches both comprise 4 3×3 convolutional layers and 1 1×1 convolutional layer, and S322 comprises:

S3221: inputting the defect shape enhanced features $F_3$ into the coarse classification branches and the coarse Bbox prediction branches, respectively, by the 4 3×3 convolutional layers, to obtain the enhanced classification features $F'_{s\_cls}$ and the enhanced coarse Bbox prediction features $F'_{s\_bbox}$, outputting the enhanced classification features $F'_{s\_cls}$ by the 1×1 convolutional layer to obtain a coarse classification result $Cls_{coarse}$, outputting the enhanced coarse Bbox prediction features $F'_{s\_bbox}$ by the 1×1 convolutional layer to obtain a coarse Bbox coordinate bias $\Delta Bbox_{coarse}$, and decoding the coarse Bbox coordinate bias $\Delta Bbox_{coarse}$ to obtain prediction Bbox coordinates $Bbox_{coarse}$; and S3222: inputting the prediction Bbox coordinates $Bbox_{coarse}$ and the enhanced classification features $F'_{s\_cls}$ into the boundary-aware module of the coarse classification branches to obtain the refined classification features $F_{cls\_g}$ with boundary awareness, and inputting the prediction Bbox coordinates $Bbox_{coarse}$ and the enhanced coarse Bbox prediction features $F'_{s\_bbox}$ into the boundary-aware module of the coarse Bbox prediction branches to obtain refined Bbox prediction features $F_{bbox\_g}$ with boundary awareness.

5. The method of claim 4, wherein S3222 comprises:

S32221: inputting the enhanced classification features $F'_{s\_cls}$ and the enhanced coarse Bbox prediction features $F'_{s\_bbox}$ into 2 3×3 convolutional layers to obtain central features $F'_{s\_c}$ and boundary features $F'_{s\_b}$, respectively, and concatenating the central features $F'_{s\_c}$ and the boundary features $F'_{s\_b}$ to obtain the concatenated features $F'_{s\_cb}$;

S32222: inputting the features $F'_{s\_b}$ and the coarse prediction Bbox coordinates $Bbox_{coarse}$ into a boundary alignment module, firstly uniformly sampling N points from four edges of a coarse prediction Bbox by the boundary alignment module, obtaining the value of the feature maps $F'_{s\_b}$ corresponding to each point by the bilinear interpolation method, and taking the maximum feature value among the N points as a boundary-aware value of a corresponding edge, and obtaining an output $F''_{s\_b}$;

S32223: simultaneously inputting the features $F'_{s\_cb}$ into the 3×3 convolutional layers and a Sigmoid function to obtain a mask for each point; and $$\text{mask} = \text{Sigmoid}(\text{conv3}(F'_{s\_cb}))$$

$$F_{cls\_g} \text{ or } F_{bbox\_g} = \text{conv1}(\text{mask} \cdot F'_{s\_cb})$$

S32224: performing element-wise multiplication on the mask and the concatenated features $F'_{s\_cb}$, and performing dimensionality reduction on the processed mask through the 1×1 convolution as output $F_{bbox\_g}$ or $F_{cls\_g}$ of the boundary-aware module.

6. The method of claim 5, wherein the calculation formula of S32222 is as follows:

$$F''_{s\_b}(i,j) = \begin{cases} F'_{s\_b}(i,j) & 0 \leq c < C \\ \max_{0 \leq k \leq N-1}\left(F'_{s\_b}(x_0, y_0 + kh/N)\right) & C \leq c < 2C \\ \max_{0 \leq k \leq N-1}\left(F'_{s\_b}(x_0 + kw/N, y_0)\right) & 2C \leq c < 3C \\ \max_{0 \leq k \leq N-1}\left(F'_{s\_b}(x_1, y_0 + kh/N)\right) & 3C \leq c < 4C \\ \max_{0 \leq k \leq N-1}\left(F'_{s\_b}(x_0 + kw/N, y_1)\right) & 4C \leq c < 5C \end{cases}$$

wherein C represents the number of channels, (i, j) represents a coordinate of each feature point, $(x_0, y_0)$ represents a coordinate of a point at an upper left corner of the coarse prediction Bbox, $(x_1, y_1)$ represents a coordinate of a lower right corner of the coarse prediction Bbox, k represents positions of sampling points (0≤k≤N−1), N represents the number of sampling points, and h and w represent the height and the width of the prediction Bbox, respectively.

7. The method of claim 6, wherein a predefined network loss function comprises classification loss Focal Loss and Bbox prediction loss GIoU Loss, wherein the classification loss comprises coarse classification loss $\text{Loss}_{cls\_coa}$ and final refined classification loss $\text{Loss}_{cls\_ref}$, and the Bbox prediction loss GIoU Loss comprises coarse prediction loss $\text{Loss}_{reg\_coa}$ and refined prediction loss $\text{Loss}_{reg\_ref}$;

the classification loss Focal Loss is calculated as follows:

$$\text{Focal Loss} = -y(1-p)^\eta \log(p) - (1-y)p^\eta \log(1-p)$$

$$\text{Loss}_{cls} = \text{Loss}_{cls\_coa} + \gamma_1 \cdot \text{Loss}_{cls\_ref}$$

wherein y represents a true label of classification, p represents a predicted value of coarse classification or refined classification, and $\gamma_1$ is a hyperparameter configured to adjust weights between coarse classification loss and the refined classification loss;

the Bbox prediction loss GIoU Loss is calculated as follows:

$$\text{GIoU Loss} = \text{IoU} - \frac{|A_c - U|}{|A_c|}$$

$$\text{Loss}_{reg} = \text{Loss}_{reg\_coa} + \gamma_2 \cdot \text{Loss}_{reg\_ref}$$

wherein IoU represents an intersection-to-union ratio between the label and the prediction Bbox, C represents a minimum enclosing shape, $A_c$ represents the area of the C, U represents areas of A and B, and $\gamma_2$ is a hyperparameter configured to adjust the weights between the coarse Bbox prediction loss and the refined Bbox prediction loss; and finally, the loss function of the entire network is calculated as follows:

$$\text{Loss} = \text{Loss}_{reg} + \gamma \cdot \text{Loss}_{cls}$$

wherein $\gamma$ is a hyperparameter configured to adjust a weight ratio between the classification loss and the Bbox prediction loss.

\* \* \* \* \*